United States Patent Office 3,424,724
Patented Jan. 28, 1969

3,424,724
ALDEHYDE-MODIFIED CARBAMATES
John D. Nordstrom, Minneapolis, Minn., assignor to Ashland Oil & Refining Company, Ashland, Ky., a corporation of Kentucky
No Drawing. Filed Oct. 24, 1965, Ser. No. 505,020
U.S. Cl. 260—70          15 Claims
Int. Cl. C08g 20/40

ABSTRACT OF THE DISCLOSURE

Coating resins are prepared by reacting a polycarbamate having at least four carbamate groups per molecule with at least one mole of aldehyde (e.g., formaldehyde) per each carbamate equivalent. The polycarbamates are derived by reacting a polyhydroxy polymer (e.g., alkyd) with either urea, or by reaction with phosgene followed by reaction with ammonia. The latter procedure allows the reaction of secondary hydroxyl groups to form carbamate groups.

DISCLOSURE

The present invention relates to resin compositions obtained by the reaction of polycarbamates with aldehydes wherein said polycarbamate is preferably derived from hydroxyl-containing polyesters and to methods for the preparation of such resin compositions.

The novel resin compositions of the present invention are condensation products of resinous polycarbamates containing at least four, and preferably from six to ten, carbamate groups per polycarbamate molecule and an aldehyde, which is employed in a concentration of at least one mole of aldehyde per carbamate equivalent, and preferably at least 1.5 moles of aldehyde per carbamate equivalent.

The present invention is based on the discovery that hydroxyl-containing polyesters, as well as other hydroxyl group-containing resins, which contain four or more hydroxyl groups per resin molecule and which thereafter are converted to carbamate groups result in superior resin vehicles for coating compositions if such are reacted with aldehydes in sufficient concentration to assure the formation of at least one alkylol group on each carbamate nitrogen. The use of such ratios and particularly the preferred ratios assures the reaction of at least one aldehyde molecule with each carbamate group prior to the curing of the resin and allows additional reaction of aldehyde with unreacted carbamate groups during the curing of the resin. The improved properties of the resins of the present invention are believed to result from the use of resins containing at least four carbamate groups and the removal of at least one hydrogen on each carbamate nitrogen.

The preferred hydroxyl-containing polyesters employed in the preparation of the novel resins of the present invention are basically reaction products of polycarboxylic acids and polyols in which the polyol is generally employed in a molar excess of 10 to 100 percent to assure the formation of hydroxyl-containing polyesters. The formation of the polyesters is well-known in the art, as for example, in the alkyd resin technology. Polycarboxylic acids, which are employed as such or in the form of their anhydrides, include saturated aliphatic dicarboxylic acids such as malonic acid, succinic acid, glutaric acid, adipic acid, pimelic acid, suberic acid, azelaic acid, sebacic acid, and brassylic acid; aromatic acids such as phthalic acid, terephthalic acid, isophthalic acid, and naphthalic acid; cycloaliphatic acids such as 1,6-cyclohexane-dicarboxylic acid; and unsaturated acids such as maleic acid, fumaric acid, and 3,6-methylene-4-cyclohexene-1,2-dicarboxylic acid.

The properties of the polyester resins employed in the present invention, particularly the molecular weight of the resin, can further be modified by the use of monocarboxylic acids such as the fatty acids, benzoic acid, and tertiary butyl benzoic acid or by the use of tri- and higher polycarboxylic acids such as trimellitic acid and pyromellitic acid.

The polyols employed in the preparation of hydroxyl-containing polyesters to be modified are polyols which contain three or more hydroxyl groups or mixtures of such with diols. The polyols, which contain three or more hydroxyl groups, are employed in at least sufficient concentrations to assure the formation of a polyester containing at least four hydroxyl groups and preferably four primary hydroxyl groups per polyester molecule. Examples of suitable polyols include: trimethylol propane, trimethylol ethane, tetramethylol cycloexhanol, erythritol, pentaerythritol, sorbitol, glycerol, and 1,2,6-hexanetriol. In general, such polyols are aliphatic or cycloaliphatic in nature and contain from three to eight carbon atoms. Diols employed in combination with the higher polyols include: ethylene glycol, diethylene glycol, propylene glycol, 1,2-hexanediol and polyethylene glycol. The polyesters employed in the present invention can further be oil-modified by the addition of mono- and diglycerides of fatty acids. This modification is well-known in the art and thus requires no further detailed description.

As indicated, method for the preparation of the hydroxyl-containing polyesters are known in the art. In general, dicarboxylic acids are heated with polyols with or without solvent, and water resulting from the condensation is continuously removed. A preferred method is to heat at reflux the components with 10 to 50 weight percent of an inert aromatic hydrocarbon solvent in the presence of 0.5 to 2.0 weight percent, based on the reactants, of an acid catalyst such as p-toluene sulfonic acid, at temperatures of 100° C. to 250° C., under a blanket of inert gas until all of the resulting water has been removed by azeotropic distillation. The hydroxyl-containing polyesters obtained normally have hydroxyl values, a property well-known in the art, of 50 to 500, although resins having hydroxyl values outside this range are suitable if they contain at least four hydroxyl groups per molecule.

The conversion of the hydroxyl-containing polyester to the polycarbamate can be accomplished by various methods, of which the reaction of urea with the polyester is preferred. The reaction of the polyester with urea, although not requiring a catalyst, is preferably performed in the presence of a metal or a metal salt catalyst such as zinc chloride, zinc acetate, silver nitrate, cobalt chloride, tin dichloride, and tin tetrachloride. The polyester and the urea are charged to a vessel equipped with an agitator and a reflux condenser. Xylene or other inert diluent is employed as a means of controlling the reactor temperature. The catalyst is added in concentrations of 0.1 to 10 percent by weight of the reactants and the agitated mixture is heated at 130° C. to 160° C. until the desired conversion is accomplished. The conversion can be determined by the cessation of evolution of ammonia gas from the reaction, or by periodically withdrawing a sample and determining the concentration of residual hydroxyls. The resultant polycarbamate can be a viscous liquid or a solid resin. The amount of urea employed in the reaction depends on the degree of conversion of hydroxyl to carbamate desired. For substantially complete conversion of the reactive hydroxyl groups, equivalent amounts or slight excesses thereof are employed. No advantage results from the use of large excesses of urea.

The formation of carbamate groups employing urea is greatly preferred when it is desired to convert only primary hydroxyl groups, since the reaction of urea with secondary hydroxyl groups is very sluggish. However, if it is desired to convert such to carbamate groups, this can be accomplished by reacting the hydroxyl-containing polyester with liquid phosgene in an inert solvent. The chloroformate is formed with evolution of HCl. The polychloroformate is reacted with two equivalents of $NH_3$ to form the polycarbamate and $NH_4Cl$. The polycarbamate obtained on removal of the $NH_4Cl$ is equivalent to the polycarbamate formed by using urea. It is to be pointed out that the latter synthesis can be employed to form carbamate groups from both primary and secondary hydroxyl groups.

The polycarbamates, which contain at least four carbamate groups per molecule, and preferably contain from six to ten carbamate groups per molecule, are then reacted with aldehydes to result in the resin compositions of the present invention. For reasons of economy and ease of reaction, formaldehyde, in aqueous or alcoholic solution, is preferred. However, other aldehydes such as acetaldehyde, butyraldehyde, furfural, benzaldehyde, acrolein, methacrolein, and glyoxal can be employed. If the formaldehyde is used in an aqueous solution, the pH of the mixture is maintained at 8.0 or above to prevent premature gelation. If the condensation is carried out in an alcoholic solution, both acidic or alkaline conditions can be employed.

When the reaction is carried out in aqueous media, the mixture of the polycarbamate and the aldehyde is heated at 80° C. to 100° C. until at least one aldehyde group has reacted with each carbamate group. This is readily determined by the extinction of absorption bands characteristic of primary amine in infrared spectra. As indicated above, it is preferred to continue the reaction until a substantial portion of the carbamate groups also have the second hydrogen on the carbamate nitrogen replaced with a methylol group when the polycarbamate is reacted with formaldehyde.

When the reaction is carried out in alcoholic media, the reaction mixture is heataed at reflux, generally from 65° C. to 120° C. In alcoholic media the reaction of formaldehyde with the carbamate results in methylol groups which react with the alcohol medium to form ether groups and by-product water. The water is removed by azeotropic distillation. The etherified methylol group, however, is effective in cross-linking during the subsequent curing of the resin since at the temperatures required for curing the etherified methylol group reacts as if it were a methylol group. The reaction is continued until the desired degree of reaction with carbamate groups has occurred.

The aqueous or alcoholic media are employed in sufficient amounts to allow proper temperature control over the reaction and, where the resin is in solution, to prevent excessive viscosities. Widely varying quantities of aqueous or alcoholic media can be employed without affecting the ability of the reaction to proceed.

The aldehyde is employed in a concentration such that at least one mole of aldehyde is present for each carbamate equivalent. Expressed differently, at least sufficient aldehyde is employed so that one aldehyde molecule can react with one carbamate group. However, it is greatly preferred to employ at least 1.5 moles of aldehyde for each carbamate equivalent. This concentration is important in order to prevent unmodified carbamate groups remaining in the resin. In general, not more than three moles of the aldehyde for each carbamate equivalent are employed, although such is not critical.

The formation of the novel aldehyde-modified polycarbamate resins of the present invention has principally been set forth in terms of hydroxyl-containing polyester materials. However, polycarbamates formed from other hydroxyl group-containing resins can equally be employed in the formation of the resins of the present invention, if they have the indicated number of hydroxyl groups and include, for example, such hydroxyl group-containing resins as polyvinyl alcohol, copolymers of vinyl alcohol and ethylene, methyl methacrylate, or ethyl acrylate, polyether polyols, and cellulosic polymers.

It is not essential that all of the hydroxyl groups on the resin employed are converted to carbamate groups, as long as at least four of such hydroxyl groups per resin molecule are converted. The hydroxyl groups not converted to carbamate groups can be further reacted with other functional compounds to achieve other properties which are desirable. Thus, the hydroxyl groups can be reacted with acid anhydrides to result in carboxyl group-containing resins which are soluble in water.

The aldehyde-modified polycarbamate resins of the present invention are organic solvent-soluble coating resins, which on application from solution, by such techniques as brushing, rolling or spraying, followed by curing through heating, form coatings of superior mechanical properties and superior chemical resistance. By chemical modification water-soluble aldehyde-modified polycarbamates can be prepared. In particular, a combination of hardness and flexibility is obtained with the resins of the present invention, which is not normally found in resin vehicles for coating applications. The coating compositions derivable from the resin vehicles of the present invention can contain such additives as are normally added to commercial compositions. Additives include pigments, fillers, driers, and the like. The coating compositions can be applied with good adhesion and film properties to such substrates as wood, metal, glass, cement, ceramic, and the like.

The invention is further illustrated by the following examples, in which all units of quantity are by weight, unless otherwise indicated.

Example 1

To a flask equipped with a water separator, a stirrer, a thermometer, and a nitrogen inlet were charged 179 g. of trimethylol propane (1.33 moles), 146 g. of adipic acid (1.0 mole), 1.7 g. of toluene sulfonic acid (0.5 wt. percent), and 36 g. xylene (10 wt. percent). The mixture was brought to reflux and heating continued until the theoretical water was removed. The acid number of the mixture was 1.9. To the reaction mixture were then added 120 g. of urea (2.0 moles) and 1.1 ml. of anydrous stannic chloride and the mixture heated at reflux (140° C.–150° C.) for ten hours. Xylene was added occasionally to maintain a temperature below 150° C. The resulting resin had a non-volatile content of 91.6%, a hydroxyl value of 6.13 (mg. of KOH required to saponify one gram of resin on esterification of the hydroxyl groups), and contained 7.4 percent nitrogen (theoretical=7.5). The theoretical equivalent weight per carbamate group was 187. The resin contained, on the average, about 6 carbamate groups per molecule.

To a flask equipped with a thermometer, an agitator, and a water separator were charged 93.5 g. of the resin described above (0.5 carbamate equivalent), 75 g. of a 40 percent solution of formaldehyde in butanol (1.0 mole) and 190 g. of butanol. The mixture was agitated on a steam bath until solution was attained. The pH of the solution was 4.3. The solution was heated to reflux until all of the water was removed and the temperature reached 120° C. The solution was stirred with sodium bicarbonate to neutralize it, filtered and stripped at 100 mm. Hg to remove one-half of the butanol and any residual water. The solution was adjusted to 50% non-volatile with butanol. The viscosity of the material was 2.25 stokes.

To the resulting resin solution was added 0.8 weight percent of zinc chloride as an ethanol solution, as a drying agent. A 3-mil wet film was drawn down on a steel panel and baked at 300° F. for thirty minutes. The film had a Sward rocker hardness of 50, had excellent xylene and caustic resistance, was not easily marred, and was not broken by a 60 inch pound reverse impact. Equivalent film properties were attained by baking the film for one minute at 400° F.

Example 2

A 3-neck round bottom flask, fitted with a stirrer, a thermometer, and a condenser was charged with 150 g. of a styrene-alkyl alcohol copolymer having an hydroxyl equivalent of 300±15, commercially available as RJ–100 from the Monsanto Chemical Company, 30 g. of urea, and 50 g. of xylene and heated to 120° C. Stannic chloride (0.6 g.) was added and the mixture heated to reflux and held for five hours. Ammonia discharged through the condenser during the reaction. The product was cooled to 80° C. At 40% solution of formaldehyde in butanol (75 g.) and 320 g. of butanol was added to the reaction. The solution was heated to 95° C. over a thirty minute period and then brought to reflux. Water was removed from the reaction by azeotropic distillation until water evolution ceased. The reaction was neutralized with sodium bicarbonate, filtered and concentrated by reduced pressure distillation to 75% nonvolatile content. The resin was diluted to 50% non-volatile content with xylene. The resin had a viscosity of 1.4 stokes.

Example 3

A polyester prepared in accordance with the procedures of Example 1 from a 6/5 molar ratio of trimethylol propane/adipic acid and having a theoretical hydroxyl equivalent weight of 170 was reacted with enough urea, as described in Example 1, to convert 62.5% of the hydroxyl groups to carbamate groups. The polycarbamate was then treated at 120° C. with enough maleic anhydride to convert 30% of the original hydroxyl groups to maleic acid half esters. The acid number of the resultant resin was 77.

The resin (337 g. at 96.5% non-volatile content) was cut with 38 g. of butyl ether of ethylene glycol, heated to 150° C., and slowly poured into a solution of 40 g. of triethyl amine in 394 g. of water at 65° C. The slurry was stirred at 100° C. until a solution resulted.

Two hundred (200) parts of the resin solution and 37 g. of formaline (37% aqueous solution of formaldehyde) was adjusted to pH 8.7 with 20% sodium hydroxide. The solution was refluxed for twenty minutes. The resin had a non-volatile content of 39.5%, a viscosity of 3.4 stokes, and a pH of 6.8.

A 3-mil wet film of resin catalyzed with 1% by weight of zinc chloride was baked at 150° C. for thirty minutes to yield a film with excellent mar resistance, a Sward hardness of 55, and excellent solvent resistance. The film on bonderized steel did not break under 60 inch pounds of reverse impact.

This example shows modification of a polycarbamate with carboxyl groups to lend greater water solubility.

Example 4

A polyester was prepared from 4 moles of trimethylol propane and 3 moles of adipic acid and then reacted with 6 moles of urea, as described in Example 1, to give a polycarbamate with a theoretical carbamate equivalent weight of 187.

The solvent-free polycarbamate (93.5 g.) was stirred with 81 g. of 37 percent aqueous formaldehyde until a good dispersion was obtained. The pH was adjusted to 8.8 and the mixture heated to 100° C. and held for one hour at that temperature. The resin solution was adjusted to 50% non-volatile content with ethylene glycol monobutyl ether. The pH of the resin was 6.8. A 3-mil film was baked thirty minutes at 300° F. to yield a solvent-resistant coating with a Sward hardness of 57 and which did not break upon 55 inch pound impact when coated on bonderized steel.

Example 5

A polycarbamate was prepared by reacting 8 moles of urea with a polyester prepared from 6 moles of trimethylol propane and 5 moles of adipic acid under conditions described in Example 1. The resin contained, on the average, about 8 carbamate groups per molecule.

The polycarbonate (108 g. at 98.5% non-volatile content, 1.0 carbamate equivalents) was stirred with 18.8 g. of 40% formaldehyde in solution in butanol (0.25 mole) and 200 g. of butanol in a 3-neck flask fitted with a stirrer, a thermometer, and a Dean-Stark water trap, at 80° C. until solution was obtained. The solution was then heated at reflux until no further water was removed by azeotropic distillation. The resin was neutralized with sodium bicarbonate. Solvent (300 ml.) was removed by distillation at 100 mm. Hg and 200 ml. of butanol added. The resin was filtered. Xylene was added to adjust the non-volatile content to 50%. A 3-mil film, on glass, containing 1% by weight of zinc chloride was baked thirty minutes at 150° C. The Sward hardness of the film was 36 and the film softened, lost adhesion and became hazy when contacted with water for fifteen minutes. A film prepared in a similar manner from a resin in which 2 moles of formaldehyde were reacted per carbamate equivalent weight had a Sward hardness of 56 and did not soften or become hazy when contacted with water.

This example shows the inferior properties obtained when less than 1 mole of formaldehyde is reacted per carbamate equivalent weight.

Example 6

A polyester was prepared by reacting 6 moles of trimethylol propane with 3.3 moles of adipic acid and 1.7 moles of phthalic anhydride and then dissolved in an equal weight of ethyl acetate. Phosgene (220 ml.) was placed in a 3-neck flask fitted with a stirrer, an ice water condenser, a dropping funnel, and a thermometer, containing 220 ml. of ethyl acetate precooled to 0° C. The solution was maintained at 0–5° C. while 706 g. of the polyester solution was added during a two hour period. The solution was allowed to warm slowly to room temperature with stirring. A rapid stream of nitrogen was bubbled through the solution for one hour to remove excess phosgene and hydrogen chloride. Ethyl acetate was removed from solution by reduced pressure distillation.

A 29% aqueous ammonia solution (346 g.) was cooled to 0–5° C. in a 3-neck flask fitted with a stirrer and dropping funnel. The product from the previous step was dissolved in an equal weight of ethyl acetate and added dropwise in two hours to the cold ammonia solution. The mixture was slowly warmed to reflux (66° C.) and held for twenty minutes. The organic layer was separated from the aqueous layer and dried. The solvent was finally stripped under reduced pressure. The presence of carbamate groups was shown by infrared absorption at 3450 cm.$^{-1}$, 3330 cm.$^{-1}$, 3200 cm.$^{-1}$, 1690 cm.$^{-1}$, and 1600 cm.$^{-1}$ and by analysis for nitrogen. The polycarbamate prepared by this method can be used to synthesize resins as described in previous examples.

Example 7

A polycarbamate (69 g. of 92.5% non-volatile content), prepared as described in Example 5, was dissolved in an equal weight of isopropyl alcohol. Forty-eight point six (48.6 g.) of formalin (37%) and 20 ml. of water were added and the pH was adjusted to 8.2 with 20% sodium hydroxide. The solution was stirred for four hours. One hundred (100) milliliters of butanol were added and the solution transferred to a 3-neck flask fitted for vacuum distillation. Distillate (125 ml.) was removed at 50 mm. Hg and 40–50° C. This process was repeated a second time. Butanol (150 g.) and xylene (25 g.) were added and the pH of the reaction adjusted to 3.8 with concentrated hydrochloric acid. The vessel was fitted with a Dean-Stark trap and the mixture heated to reflux. The reaction was discontinued when water stopped azeotroping. The resin was neutralized with sodium bicarbonate, filtered and concentrated to 50% non-volatile content. The pH was 6.6 and viscosity 2.9 stokes. A 3-mil film of the resin containing 1% by weight of zinc chloride was baked thirty minutes at 150° C. to yield a hard, solvent-resistant coating which did not break under 65 inch pound reverse impact on bonderized steel.

The foregoing examples have illustrated the formation of the aldehyde-modified polycarbamate resins of the present invention, the properties of coatings produced from such resins as well as the surprising improvement resulting from the use of ratios of aldehyde to carbamate set forth hereinabove. It will be apparent that other hydroxyl-containing resins, and particularly other hydroxyl-containing polyesters having the necessary hydroxyl groups, but not specifically described in the foregoing examples, can similarly be converted into polycarbamates and modified with aldehydes using the specific techniques disclosed in the examples.

What is claimed is:

1. A resin composition comprising the reaction product of at least six moles of aldehyde and one mole of a resinous polycarbamate containing at least four carbamate groups per molecule in a ratio providing at least one mole of aldehyde per carbamate equivalent, said resinous carbamate being derived from a resinous material containing at least four hydroxyl groups per molecule and selected from the group consisting of polyesters, polyvinyl alcohol, copolymers of vinyl alcohol and ethylene, copolymers of vinyl alcohol and methyl methacrylate, copolymers of vinyl alcohol and ethyl acrylate, polyether polyols, and cellulosic polymers.

2. A method of preparing a coating resin vehicle which comprises reacting one mole of resinous polycarbamate containing at least four carbamate groups per molecule with at least six moles of an aldehyde, said aldehyde being employed in a concentration of at least one mole of aldehyde per carbamate equivalent of polycarbamate, said resinous polycarbamate being derived from a resinous material containing at least four hydroxyl groups per molecule and selected from the group consisting of polyesters, polyvinyl alcohol, copolymers of vinyl alcohol and ethylene, copolymers of vinyl alcohol and methyl methacryate, copolymers of vinyl alcohol and ethyl acrylate, polyether polyols, and cellulosic polymers, and recovering aldehyde-modified polycarbamate containing no unmodified carbamate groups.

3. The resin composition of claim 1 wherein said polycarbamate is derived from hydroxyl-containing polyesters.

4. The resin composition of claim 1 wherein said polycarbamate is obtained by the reaction of urea with hydroxyl-containing polyesters.

5. The resin composition of claim 1 wherein said aldehyde is formaldehyde.

6. The resin composition of claim 3 wherein the polyester is obtained by the reaction of dicarboxylic acids with a polyol containing at least three hydroxyl groups.

7. The resin composition of claim 1 wherein said polycarbamate is obtained by the reaction of a primary hydroxyl-containing polyester of a polyol having at least four hydroxyl groups and a dicarboxylic acid, and wherein the aldehyde is formaldehyde.

8. The resin composition of claim 1 wherein said polyol is trimethylol propane.

9. The resin composition of claim 7 wherein the polyester is a polyester of trimethylol propane and adipic acid.

10. The resin composition of claim 1 wherein the concentration of aldehyde is from 1.5 to 3 moles of aldehyde per carbamate equivalent.

11. The resin composition of claim 10 wherein the polycarbamate contains from 6 to 10 carbamate groups per molecule.

12. A substrate having deposited thereon a heat hardened film of the resin composition of claim 1.

13. The method of claim 2 wherein said polycarbamate is obtained by the reaction of urea with a primary hydroxyl-containing polyester.

14. The method of claim 13 wherein said polyester is the reaction product of a polyol containing at least three primray hydroxyl groups and a dicarboxylic acid.

15. The method of claim 2 wherein the from 1.5 to 3.0 moles of aldehyde are employed per carbamate equivalent.

References Cited

UNITED STATES PATENTS 2,956,964  10/1960  Christenson et al. _____ 260—15
3,055,867  9/1962  Le Bras et al. _____ 260—75

WILLIAM H. SHORT, Primary Examiner.

H. SCHAIN, Assistant Examiner.

U.S. Cl. X.R.

260—29.4, 67, 33.4, 72; 117—124; 260—73, 75, 77.5, 17.3; 117—126, 132, 148, 161; 260—33.6